March 22, 1960 A. R. McCLOSKEY 2,929,131
METHOD AND APPARATUS FOR MAKING ANTIFRICTION BEARINGS
Filed Sept. 28, 1956 6 Sheets-Sheet 5

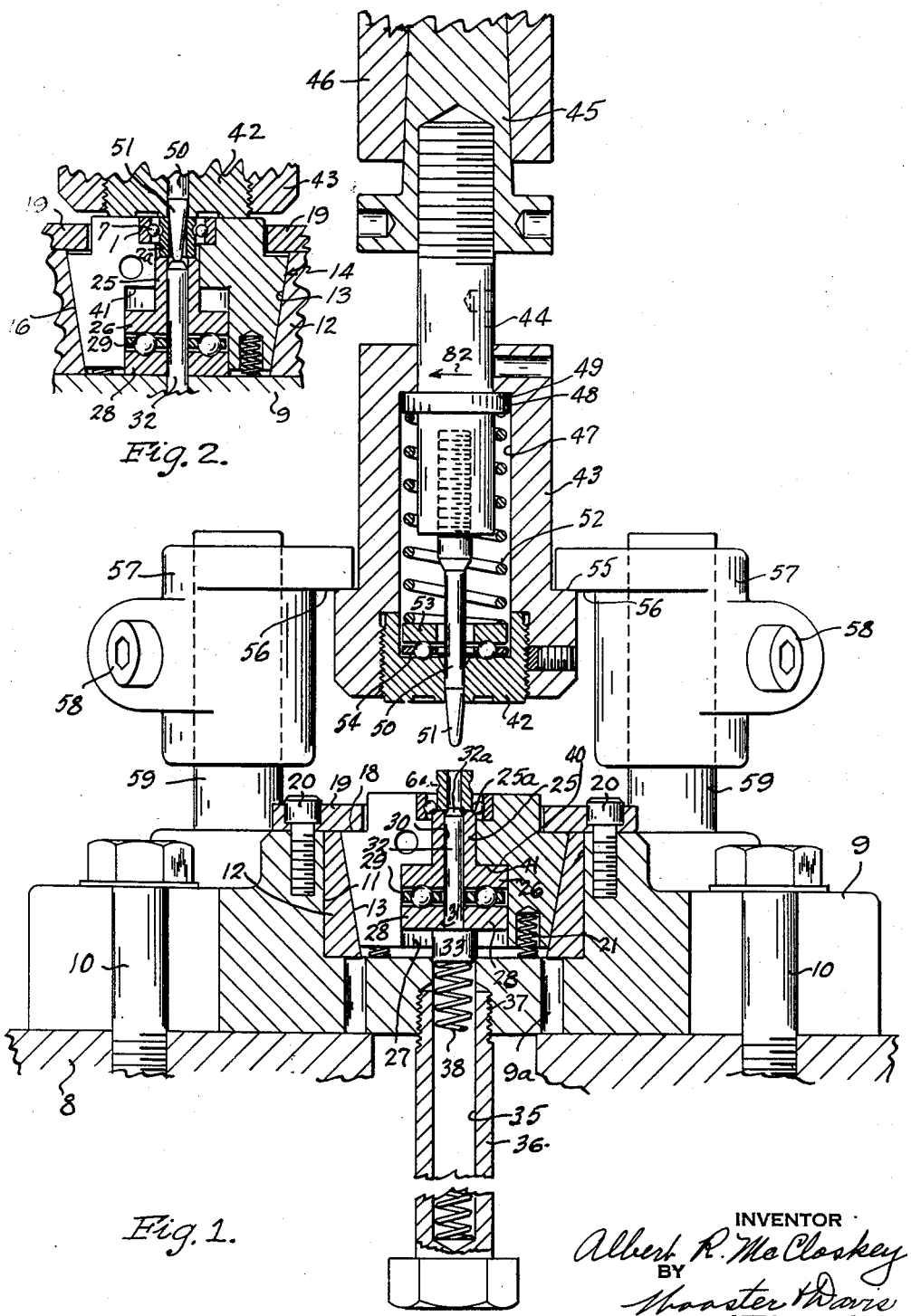

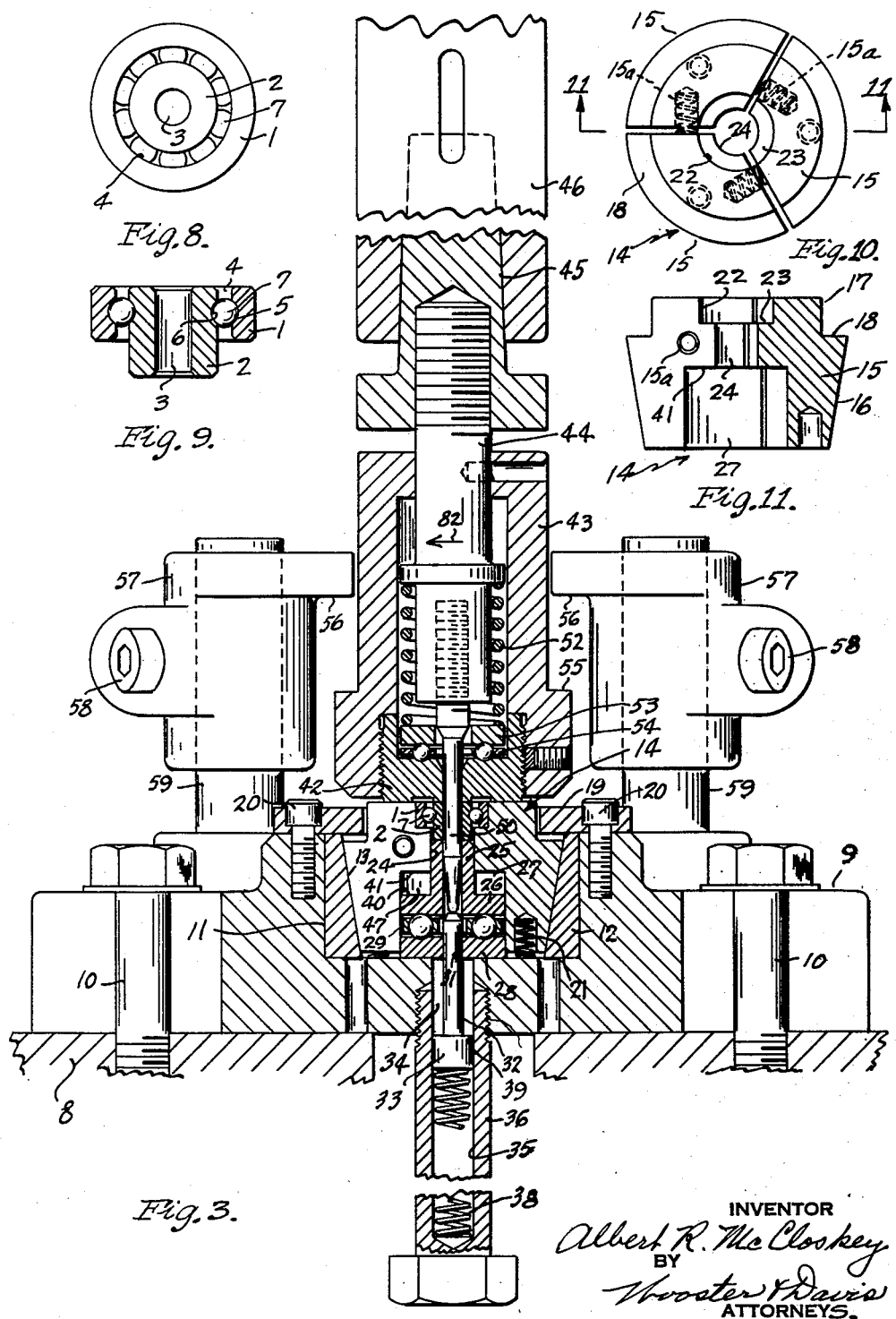

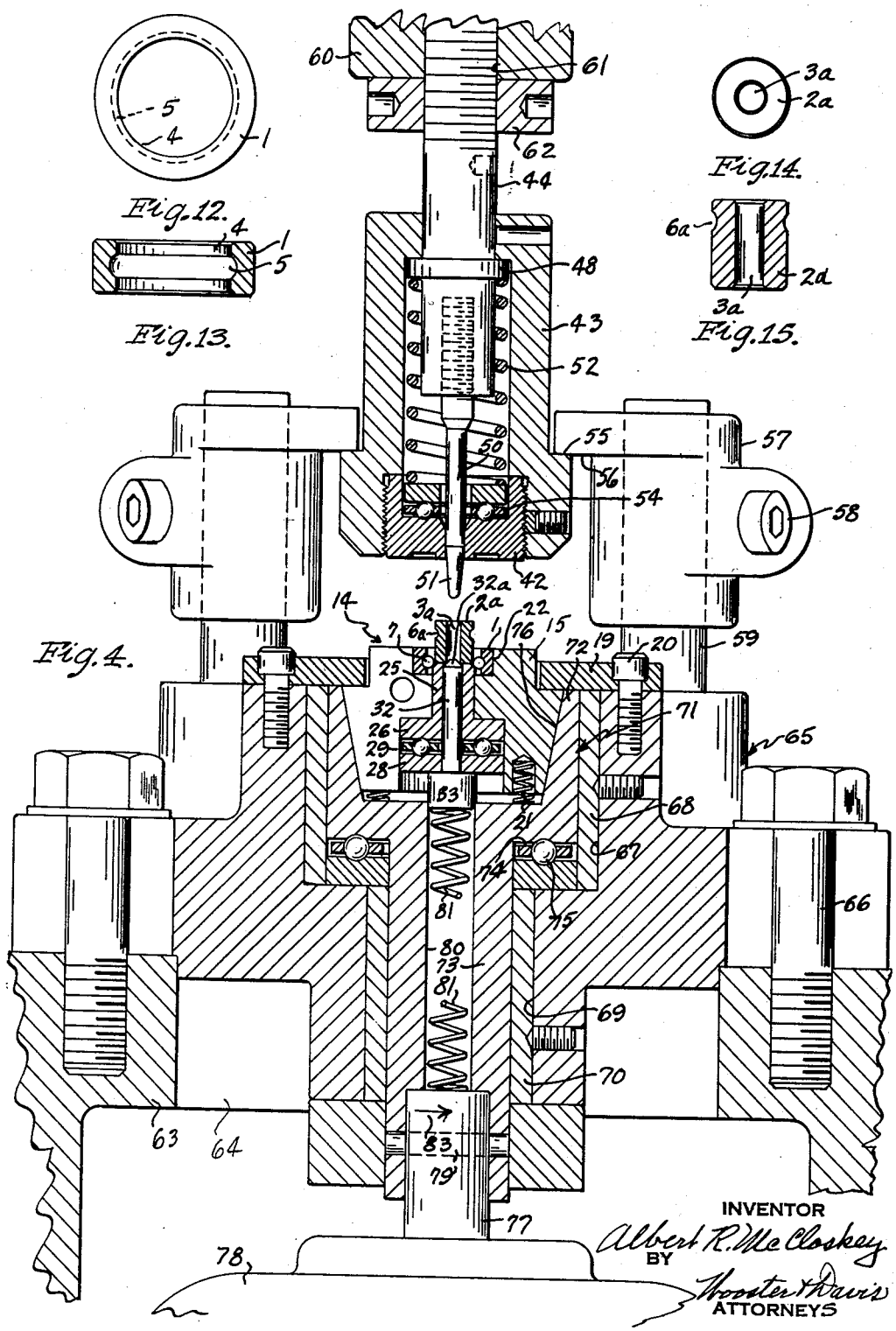

INVENTOR
Albert R. McCloskey
BY
Wooster & Davis
ATTORNEYS.

March 22, 1960 A. R. McCLOSKEY 2,929,131
METHOD AND APPARATUS FOR MAKING ANTIFRICTION BEARINGS
Filed Sept. 28, 1956 6 Sheets-Sheet 6

INVENTOR
Albert R. McCloskey
BY
Wooster & Davis
ATTORNEYS

United States Patent Office 2,929,131
Patented Mar. 22, 1960

2,929,131

METHOD AND APPARATUS FOR MAKING ANTIFRICTION BEARINGS

Albert R. McCloskey, Fairfield, Conn., assignor, by mesne assignments, to Channing Corporation, New York, N.Y., a corporation of California Application September 28, 1956, Serial No. 612,679

10 Claims. (Cl. 29—148.4)

This invention relates to a method and apparatus for making antifriction bearings of either the ball or roller bearing type, and has for an object to provide an improved method of making and assembling antifriction bearings by expanding the inner raceway member into interlocking relation with a quota of rolling elements in aligned raceways in the outer and inner bearing members and employing the rolling elements to coin, size, work and burnish the raceway surfaces by rotating one or both of the bearing members relative to the other, while expanding the inner bearing member.

Another object is to provide a method whereby antifriction bearings may be assembled with unbroken raceways for the antifriction rolling elements and with a full quota of these elements in these raceways, also to provide a method by which these bearings may be assembled which will permit the use of a one-piece separator for the rolling elements when assembling the bearing.

Another object is to provide an improved means of assembling the bearing whereby each bearing would have a greater load capacity, and may be heat treated after assembly for still greater load capacity and greater wearing qualities.

With the foregoing and other objects in view, I have devised the novel method with means by which it may be accomplished as illustrated in the accompanying drawings forming a part of this specification. It is, however, to be understood the invention is not limited to the specific details shown or described, but may embody various changes and modifications within the scope of the invention.

In these drawings:

Fig. 1 is a vertical section of a die set which may be used in a drill press or similar device for assembling this bearing, and showing the dies separated or in their retracted position preparatory to assembling the bearing;

Fig. 2 is a similar section through a portion of the dies showing them in an intermediate position in the method of assembling the bearing;

Fig. 3 is a section similar to Fig. 1 showing the dies in their final position after completing the assembling of the bearing and before retracting them to the position of Fig. 1;

Fig. 4 is a sectional view similar to Fig. 1 showing a modified arrangement of the die set adapted for use in a power press with a non-rotating spindle, and with the parts in the retracted position preparatory to the operation of assembling the bearing;

Fig. 8 is a plan view showing as an example an assembled bearing which may be formed by this method;

Fig. 9 is a longitudinal section thereof;

Fig. 10 is a plan view of the lower die which may be used in the die set for holding the bearing elements during the assembling operation;

Fig. 11 is a section thereof substantially on line 11—11 of Fig. 10;

Fig. 12 is an end view of a form of outer bearing member which may be used in the bearing assembled by this method;

Fig. 13 is a transverse section thereof;

Fig. 14 is an end view of an inner bearing member which may be assembled in the outer bearing member of Figs. 12 and 13 by this method;

Fig. 15 is a longitudinal section thereof;

Fig. 16 is a sectional view of the bearing showing the use of a one-piece cage or separator for positioning the balls of the bearing and showing the elements preparatory to performing the expanding operation;

Fig. 17 is a similar section showing the arrangement of the elements after the expanding operation of the inner member to complete the bearing;

Fig. 18 is a partial side view looking toward the bottom of Fig. 17;

Fig. 19 is a top plan or outer edge view of a portion of the cage or separator used in Figs. 16 to 18 for separating the balls;

Fig. 20 is a transverse section of the cage or separator showing a ball in place, and Fig. 21 is a partial side view and partial section of this separator with one of the balls in place.

Figure 5:
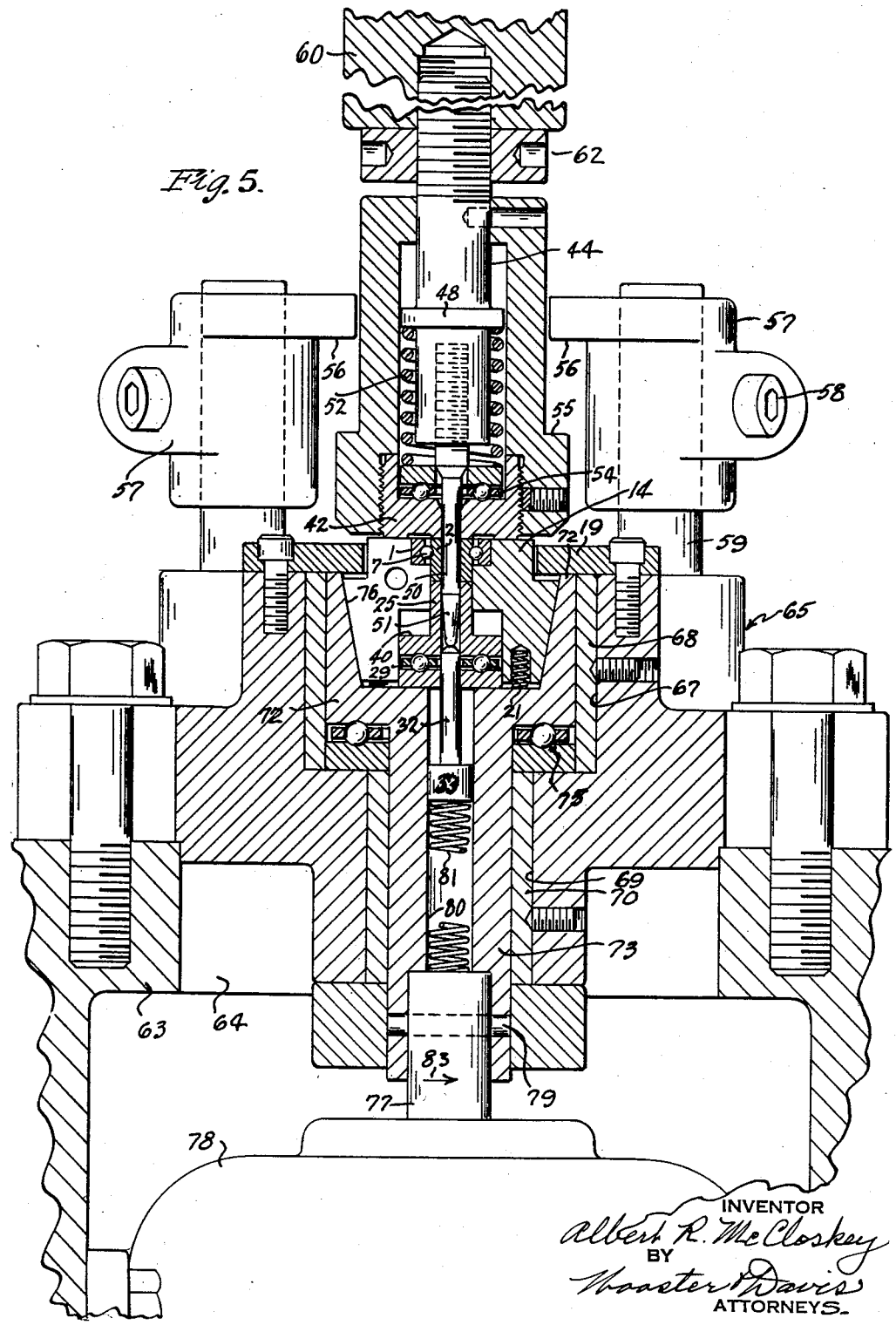
Fig. 5 is a similar section showing the parts in a position after assembling the bearing.

For the purposes of illustration this method is described in connection with the assembly of an antifriction bearing of the ball type, but it will be understood that this same method can be used for assembling bearings of the so-called roller bearing type using cylindrical or tapered rollers for the antifriction rolling elements instead of the ball elements, and with correspondingly shaped raceways for the rolling members or elements. Thus, as indicated for the purposes of illustration, this method is described in connection with an antifriction bearing of the ball type comprising an outer bearing member 1 in the form of a circular ring and an inner bearing member 2 in the form of a circular member having a longitudinal bearing opening or hole 3 therethrough, the outer member having a longitudinal circular opening 4 therethrough with a raceway 5 in the face of this opening, and the inner member 2 having a raceway 6 in its outer surface in alignment with the outer raceway 5 in which runs the antifriction rolling elements, in this case the spherical balls 7. In this improved method of assembling the bearing, the outer bearing or race member 1 is formed with the longitudinal circular opening 4 therethrough and the outer raceway 5 formed in the face of this opening, as shown in Figs. 12 and 13. The inner bearing or race member 2 is formed of an undersized circular member 2a of suitable ductile material, such, for example, as the proper form of steel, as shown in Figs. 14 and 15, with a longitudinal opening or hole 3a of reduced size therethrough and an inner raceway 6a formed in its outer surface. This inner bearing member is of a size that it may be placed in the opening 4 in the outer bearing member with a quota of the antifriction rolling elements, in this case the spherical balls 7, between the inner and outer bearing members in the aligned raceways 5 and 6a. Then the undersized inner bearing member 2a is expanded to interlock said quota of antifriction rolling members 7 in the raceways of said outer and inner bearing members, and at the same time or simultaneously with the expanding operation of the inner bearing member, causing relative rotation between the outer and inner bearing members to bring the rolling members into good bearing running fit with the raceways of the outer and inner bearing members. The relative rotation between the outer and inner bearing members may be effected by rotating either member relative to the other or by simultaneously rotating both members, which could be by rotating them at different speeds, but preferably by rotating them in opposite directions.

The drawings illustrate different die sets which may be used to assemble this bearing by this method, and showing different arrangements whereby either the outer or the inner bearing member may be rotated while the inner bearing member is being expanded to the assembled position, and also an arrangement whereby both the inner and outer bearing members may be simultaneously rotated during the expanding operation of the inner bearing member in the assembling of the bearing.

Referring first to the form of Figs. 1, 2 and 3, a die set is shown which may be used in a drill press or similar machine having a vertically movable rotating spindle for assembling the bearing by expanding the inner bearing member and at the same time rotating this inner bearing member during the expanding operation while the outer bearing member remains stationary. In the arrangement shown the bed of the drill press is shown at 8 on which is mounted a base or block 9 by any suitable means, such as the bolts or screws 10. This block 9 is provided with a recess 11 in its upper wall in which is seated a sleeve 12 having a tapered opening 13 therethrough, the taper being upwardly and outwardly. The block may be provided with openings 9a in which a tool may be inserted to remove the sleeve. Mounted in this tapered opening 13 is a sectional holding die or chuck 14 comprising the three jaw members 15 having an upwardly and outwardly tapered wall 16 corresponding to the tapered wall 13 of the sleeve and seated therein, but of less length than the sleeve, so that this die or chuck may have a limited up and down movement in the sleeve. The upper end portion is of reduced diameter, as indicated at 17, providing a shoulder 18 which cooperates with a flat ring 19 mounted on the base 9 by any suitable means, such as the screws 20, retaining the sleeve 12 in the recess and cooperating with the shoulders 18 to limit upward movement of this die. It is normally held in its upper position by the springs 21 seating on the bottom of the recess 11 and located in sockets in the under side of the die sections 15.

In its top surface the die is provided with a recess 22 of a diameter and depth to receive the outer bearing member 1 seating on the bottom 23 of this recess as indicated in Fig. 1. Leading downwardly from the bottom of this recess is a passage 24 of smaller diameter in which is a reduced upper portion 25 of a sliding tubular member provided with an enlarged lower head or flange 26 adapted for limited vertical movement in the enlarged lower portion 27 of the opening 24. Below the enlarged head 26 is a lower thrust bearing member 28 supported on the bottom of the recess or socket 11 with an antifriction thrust bearing 29 between this member and the member 26. The members 25 and 28 have aligned passages 30 and 31 therethrough in which is slidably mounted a pilot and centering pin 32 having an enlarged lower end 33 in a passage 34 in the bottom of the block 9 and a passage 35 in a sleeve 36 mounted at its upper end 37 in the under side of the block 9 and carrying a spring 38 pressing against the under side of the member 28 and supported at its lower end by the lower end of the passage 35. This spring therefore tends to shift the pilot 32 upwardly to the position of Fig. 1. This movement also forces the shoulder 39 at the upper side of the member 33 against the under side of the member 28 and shifts this member with the thrust bearing and the tubular support 25 to the upper position of Fig. 1, the upward movement of both the members 25 and the pilot 32 being limited by the shoulder 40 on the upper side of the member 26 engaging the shoulder or top wall 41 of the recess or passage 27.

Above the lower die 14 is an upper die 42 mounted in a recess in the lower end of a carrier or support 43 carried by means of a stud 44 in a tapered member 45 adapted to fit any suitable holder or chuck 46 on the rotating and vertical movable spindle of a drill press or similar machine (not shown). The support or carrier 43 has a longitudinal passage 47 into which the lower end of the stud 44 projects and is slidable longitudinally, its upward movement being limited by a flange 48 engaging a shoulder 49 at the upper end of the passage. Carried by this stud and depending from its lower end is a suitably tapered punch 50 having a tapered lower end 51. Between the flange 48 and the die 42 is a coil spring 52 pressing at its lower end on the upper member 53 of an antifriction thrust bearing 54 seating in a recess in the top of the die 42. This spring therefore tends to shift the support 43 to and retain it in its lower position, or expressed another way, shift the punch 50 to its upper position in the die. Upward movement of the member 43, together with the die 42 and the punch 50, is limited by an annular shoulder 55 on the member 43 adapted to engage suitable stop shoulders 56 on stop members 57 adjustably mounted and clamped by suitable clamping means 58 on upwardly extending studs 59 mounted in the base member 9.

In the operation of assembling the bearing the parts are first in the retracted position shown in Fig. 1. The outer bearing member 1 of the bearing with its longitudinal opening 4 and the raceway 5 is placed in the recess 22 in the lower die 14 and resting on the bottom of this recess. In this position the upper end of the member 25 projects a short distance into the opening in this bearing member, as shown in Fig. 1. Then the balls 7 are placed in this outer bearing member and are supported therein in the raceway 5 by the tapered upper end 25a of this member 25. Then the undersized inner bearing member 2a is placed in the outer bearing member 1 on top of the upper end of the member 25, as shown in Fig. 1. Then as the rotating spindle 46 of the drill press or similar machine is lowered, it carries down with it the support or carrier 43, the die 42, and the punch 50. This carries the lower end of the die 42 against the top of the lower die 15 and inserts the tapered lower end 51 of the punch into the undersized opening 3a in the undersized inner bearing member 2a as shown in Fig. 2. The pressure of the upper die 42 on the lower die 14 shifts it downwardly a short distance, as shown in Fig. 2, causing the taper 13 on the sides of the opening in the sleeve 12 cooperating with the tapers 16 on the outer surfaces of the die members 15 to force these members inwardly against action of the springs 15a, and causes the sides of the recess 22 to firmly grip the outer surface of the outer bearing member 1. Also at the same time, as the tapered lower end 51 of the punch enters the undersized opening 3a in the inner member 2a, it shifts this member downwardly to the position of Fig. 2 to carry the raceway 6a in the outer surface of this member into alignment with the raceway 5 in the outer bearing member 1 and in alignment with the balls 7, as shown in Fig. 2. This downward movement of the member 2a shifts its supporting member 25 downwardly so that it rests on the bottom of the recess 11, and at the same time shifts downwardly the pilot pin 32 against the action of the spring 38. The upper end of this pilot pin is tapered, as shown at 32a, to seat in the lower end of the undersized opening 3a in the member 2a to thus center this member as it is placed on the upper end of the supporting member, as shown in Fig. 1. As the parts reach the position of Fig. 2, further downward movement of the upper die 42 and the supporting member 25 for the undersized inner bearing member 2a is arrested, and further downward movement of the rotating spindle 46 will carry with it the punch 50 and force its tapered lower end and a portion of its upper cylindrical body portion through the opening 3a, as shown in Fig. 3, this further movement being permitted by further shifting of the pilot 32 downwardly against the action of the spring 38. The cylindrical body portion of the punch 50 is larger than the opening or hole 3a in the member 2a, so that as it passes through this member it will expand it to the position of Fig. 3, to thus assemble the antifriction bearing with the inner and outer members 1 and 2 interlocked with the antifriction rolling elements 7, in this case the spherical balls, in proper running bearing relation between the rolling elements and the raceways of the outer and inner bearing members 1 and 2. As the spindle 46 of the drill press or similar machine is rotating during its downward movement, and also the punch 50 is rotating with it, and thus is rotating during the expanding of the inner bearing member 2a to its finished expanded size 2, this punch will simultaneously rotate the inner member 2a during the expanding operation, and this relative rotation with respect to the outer bearing member 1 will cause the rolling elements 7 to rotate and have a coining, sizing and burnishing action on the surfaces of the raceways 5 and 6 of the outer and inner bearing members, thus providing an accurate, proper running bearing fit between the outer and inner bearing members and the antifriction rolling elements, as well as assemble and interlock all these elements together, all in the same simultaneous operation. Also by making the punch 50 of proper size, this movement of the punch through the inner bearing member will properly and accurately size and finish the surface of the inner longitudinal bore 3 through this inner bearing member. During this action of expanding the inner bearing member into interlocking and assembled relation with the outer bearing member through the rolling elements, the outer bearing member 1 has been held stationary in the lower die 14. During this expanding and rotating movement of the inner bearing member 2a, it is permitted to rotate freely as it is supported on the member 25 which is permitted to rotate with it as it is supported on the thrust bearing 29. The stud 44 and the punch 50 are permitted to rotate in the member 43 because they are supported on the thrust bearing 54.

After this assembling of the bearing die and expanding operation on the inner bearing member, the rotating spindle 46 is retracted, raising the upper die 42 with its carrier 43 and the punch 50 upwardly. As these parts move upwardly, the pressure on the lower die 14 is released, permitting it to be shifted upwardly by the springs 21, and this permits the separate blocks or jaws 15 of this die to be shifted outwardly a short distance by the springs 15a to release their grip on the outer bearing member 1. As the upper die 42 and punch 50 continue their upward movement they carry with it the assembled bearing until the shoulder 55 on the member 43 engages the stops 56. This arrests upward movement of the member 43 and the die 42, but permits continued upward movement of the punch 50 until the flange 48 engages the stop shoulder 49. During this movement the bearing is held by the lower surface of the die 42 so that the punch 50 is withdrawn from the bearing, thus stripping the bearing from the punch.

It will be understood from the above that in this arrangement of the die set the outer bearing member 1 is held stationary, and relative rotation between this member and the inner bearing member 2a during the expanding and assembling operation is effected by rotating this member 2a, but a similar effect or relative rotation between the two bearing members may be effected by rotating the outer bearing member 1 during the assembling and expanding of the inner bearing member while the inner bearing member is not rotated. Such a device is shown in Figs. 4 and 5. In this die set the upper die 42 is mounted in the same construction and arrangement as that shown in Figs. 1 and 3, except that instead of the upper end of the stud 44 being mounted in a rotating spindle 46 of a drill press or similar machine, it is mounted in the lower end of a non-rotating plunger 60 of a power press or similar machine (not shown) by threading it into this plunger, as indicated at 61, and securing it by a lock nut 62. The relative rotation between the outer bearing member 1 and the inner bearing member 2a during the assembling of the antifriction bearing by the expanding of the inner member 2a by the punch 50 is effected by rotating the outer bearing member 1 during this expanding operation. Means for doing this is shown in Figs. 4 and 5. In this arrangement, mounted on the bed 63 of the press and over the opening 64 therein is secured a lower die block 65 by any suitable means such, for example, as the screws 66. Mounted in a recess 67 in this block is a bearing bushing or sleeve 68 and leading downwardly from the recess 67 is a reduced cylindrical passage 69 in which is another bearing sleeve 70. Mounted in these bearing sleeves is a die carrier or support 71 having an enlarged upper end 72 running in the bearing sleeve 68 and a reduced lower portion 73 running in the lower bearing sleeve 70, and between these two portions there is a shoulder 74 supported on an antifriction thrust bearing 75. In the upper enlarged head portion 72 of this rotating carrier is a tapered recess 76 corresponding to the tapered opening 13 in the sleeve 12 of the form of Figs. 1 and 2, and seated in this recess is the lower die 14 comprising the three separate die blocks or jaws 16, the same as used in the form of Figs. 1 and 2. The lower end of the rotating member 71 is connected to the upper end of an upright shaft 77 of a suitable electric motor 78, and secured thereto so as to rotate with this shaft by any suitable means, such, for example, as the pin 79. Through the lower portion 73 of the rotating member 71 and communicating with the bottom of the recess 76 is a passage 80 forming a guide for the enlarged head 33 of the pilot 32, with a spring 81 in this passage tending to shift the pilot 32 and the associated supporting member 25 upwardly to the position of Fig. 4, the same as in the device of Figs. 1 and 2.

Thus in the operation of this device, with the parts in the retracted position of Fig. 4, the outer bearing member 1 is placed in the recess 22 in the lower die member 14, the same as described in connection with the first form. The balls 7 are inserted in the raceway in this member and supported on the tapered end of the member 25, which is held with its upper end extending part way into the opening 4 in the bearing member 1. If the die is rotating the balls will be held in the raceway by centrifugal action. Then the undersized inner bearing member 2a with its outer raceway 6a is inserted in the outer bearing member 1 and supported on the top of the member 25 and properly centered by the tapered upper end 32a of the pilot 32, as indicated in Fig. 4. During this operation, the lower die 14 may or may not be rotated by the spindle or shaft 77 of the motor 78. If it is rotated this rotation will tend to keep the balls in the raceway 5 and properly distribute them throughout this raceway. After the parts of the bearing have been assembled as shown in Fig. 4, the plunger 60 of the press is shifted downwardly carrying with it the support 43 and the punch 50. At the same time the motor 78 is rotating the lower die 14, and as the upper die 42 engages the top of the lower die 14 it forces it downwardly a short distance to the position of Fig. 5, as described in connection with the first form, causing the tapered walls of the recess 76 to force the jaws 15 together to grip the outer bearing member 1. As the tapered lower end of the punch enters the undersized hole 3a in the undersized inner bearing member 2a, it forces it downwardly to the position corresponding to the position of Fig. 2, carrying with it the support 25 and pilot 32. Further movement of the punch downwardly will carry it through the opening 3a to the position of Fig. 5, causing the cylindrical body portion of the punch to expand the undersized inner bearing member 2a to assemble the bearing and interlock it with the outer bearing member 1 through the rolling elements 7, the same as described in connection with the first arrangement of the die set. However, in this arrangement of the die set, the punch 50 and the inner bearing member 2a do not rotate during the expanding operation, but the outer bearing member 1 is rotated during this expanding operation by the rotation of its supporting and gripping die 14, which is effected by the motor 78. The lower die 14 is permitted to rotate relative to the supporting member 25 by the thrust bearing 29, and also the upper die 42 with its carrier or support 43 is permitted to rotate with the lower die through the thrust bearing 54.

Thus in this die set arrangement the same effect is secured of expanding the undersized inner bearing member to the locking position, and the coining, sizing and burnishing operations effected by the rolling elements during the expanding operation are secured by rotating the outer bearing member simultaneously with the expanding operation while the inner bearing member is held stationary. The release of the assembled bearing and its stripping from the punch is effected by raising the plunger 60 and with it the carrier 43, die 42 and the punch 50, as described in connection with the first die set.

Figure 6:
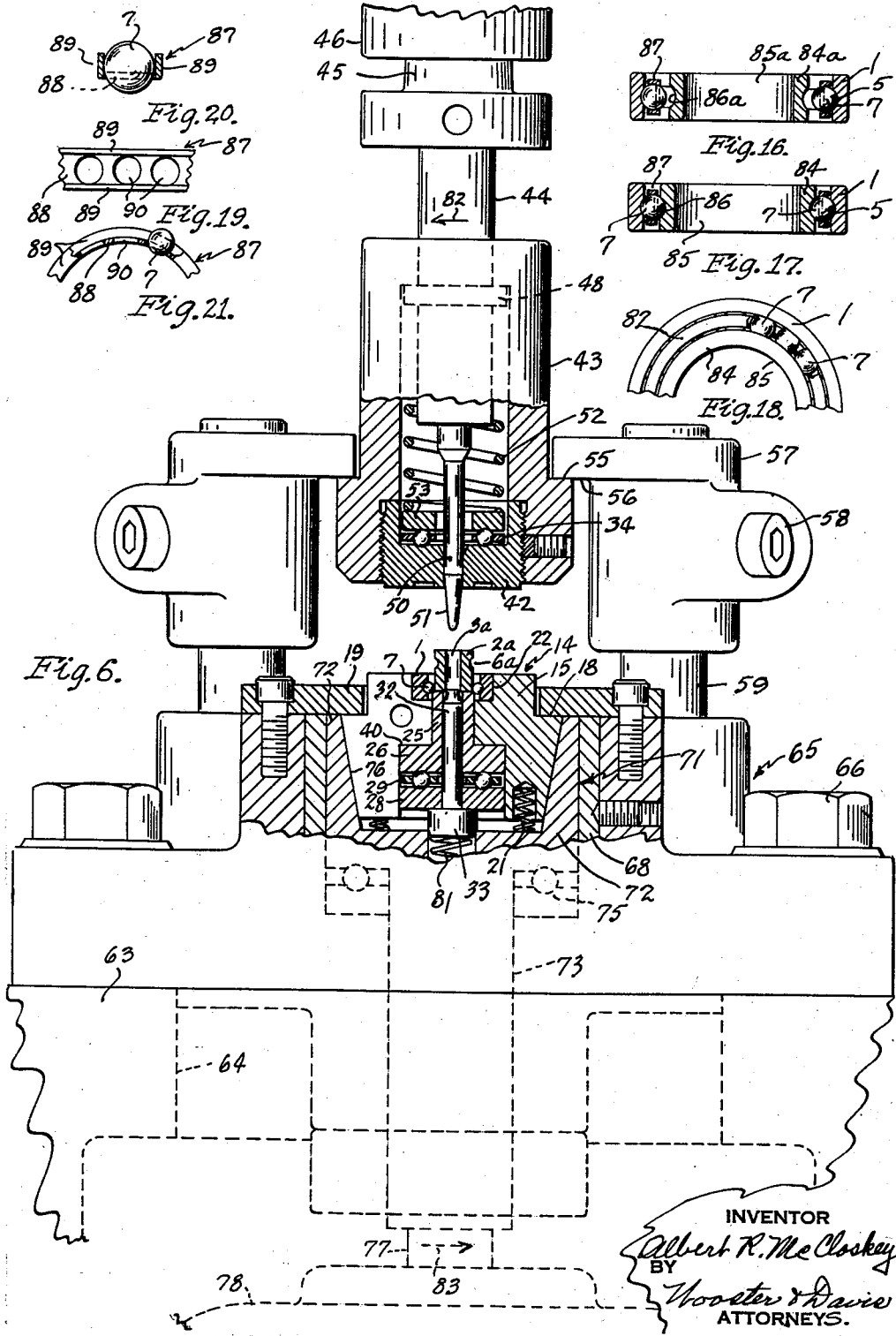
Fig. 6 is a section similar to Fig. 1 showing a still further modified arrangement of the die set with the parts separated preparatory to assembling the bearing.
Figure 7:
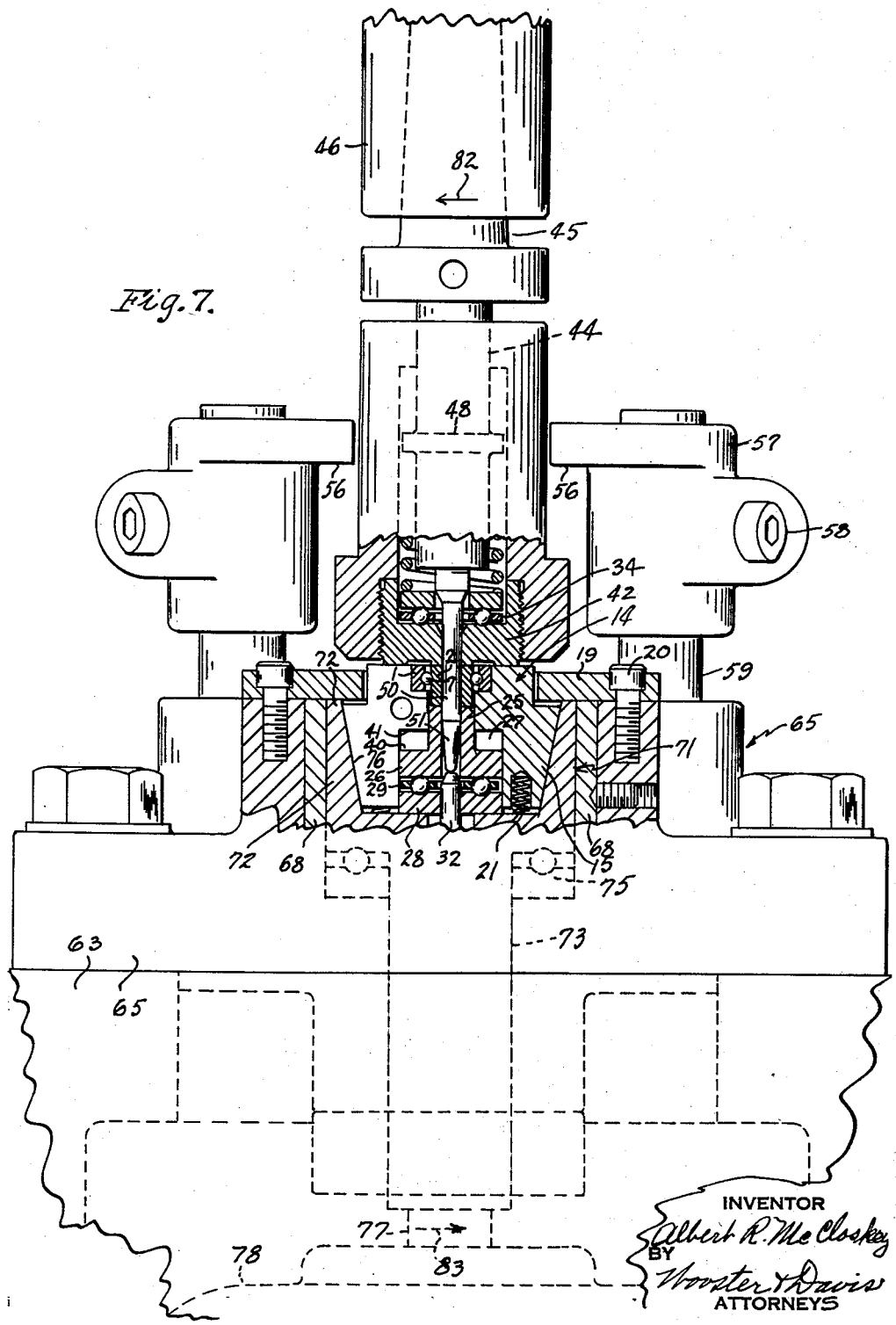
Fig. 7 is a similar view showing the parts of Fig. 6 in position after completing assembling of the bearing.

In these two forms or arrangements of die sets, one of the bearing members of the bearing, either the inner bearing member or the outer bearing member, has been held stationary during the expanding operation of the inner bearing member, and the other member has been simultaneously rotated during this expanding and assembling operation, to secure the novel result and effect. However, this method is not limited to these specific operations, as the same novel effect and improved results may be secured by rotating both the inner bearing member and the outer bearing member simultaneously with and during the operation of expanding the undersized inner bearing member to the interlocked assembled and finished running bearing position. They could be rotated in the same direction at different speeds, but naturally a more practical operation would be to rotate them in different directions during the assembling and expanding operation of the inner bearing member. Such a die set arrangement is shown in Figs. 6 and 7. This arrangement combines parts of both the first two sets described. Thus the support and rotating means for the lower die 14 to carry and rotate the outer bearing member 1 is the same in this arrangement as shown and described in Figs. 4 and 5. Also the support for operating and rotating the inner bearing member 2a during the operation of expanding it to the assembled and interlocking arrangement with the outer bearing member 1 and the rolling elements 7, is the same as that shown in Figs. 1 and 3, and the same reference characters are used in Figs. 6 and 7 to indicate the corresponding parts as are used in Figs. 1 to 5. The operation of expanding the undersized inner bearing member 2a is the same as that described in connection with the previous die sets, except that in this die set both the outer bearing member 1 and the inner bearing member 2a are rotated simultaneously with the expanding operation of the inner bearing and in opposite directions, as indicated by the arrows 82 and 83. That is, the retracted position, as shown in Fig. 6, permits the insertion of the outer bearing member 1, the rolling elements 7 and the undersized inner bearing member 2a in the lower die 14. Then the upper die 42 with the punch or plunger 50 are forced downwardly by the rotating spindle 46 of a drill press or similar machine to the position of Fig. 7, effecting the expansion of the undersized inner bearing member 2a to the interlocked position with the outer bearing member 1 and the rolling elements 7, and the simultaneous rotation of the upper die and punch and associated parts with the rotation of the lower die and its associated parts during and with the expanding operation, effects the assembly of the bearing, the interlocking arrangement between the inner and outer bearing members and the rotating elements, and causes the simultaneous rotation of the bearing elements during this expanding of the inner member to effect the coining, sizing and burnishing action between the rolling antifriction elements and the raceways of both the inner and outer bearing members, to coin, size and finish these raceways to a high degree of finish and precision and bring them to an accurate, smooth running bearing fit.

Another example of bearings which may be made and assembled by this method is shown in Figs. 16 to 21. In these figures the same type of bearing is shown as that of the other figures, including Figs. 8 and 9, except that the inner bearing member or ring 84 is somewhat shorter than member 2, and instead of the balls 7 being free as indicated in Figs. 8 and 9, a cage or separator is used to properly position these balls in the raceways, and maintain them in these positions during use of the completed bearing. Any suitable type of cage or separator may be used, but as the bearing is assembled and completed by expanding the undersized inner bearing member 84a, this permits the use of a continuous one-piece cage or separator which is not possible with the ordinary assembling methods. A simple and effective one-piece cage or separator is shown at 87 as a circular ring of substantially U-shaped cross section with the connecting or transverse portion 88 between the parallel sides 89, as shown in Figs. 19 and 21, provided with spaced holes or openings 90 in which the balls are located and by which they are properly spaced and located in the finished bearing. The balls are assembled in the cage and in the raceway 5 in the outer bearing member 1, and the inner undersized member 84a placed in position and expanded to member 84 to complete this bearing, by forcing a proper sized punch through the opening 85a, while either the inner bearing member or outer bearing member or both, is or are being rotated as described in connection with the first form of bearing without the cage or separator.

This method of assembling and producing antifriction bearings permits the accurate assembling and fitting of the bearing parts quickly and in a single operation, thus greatly reducing the cost of the bearing. It also permits the use of unbroken raceways, as it is not necessary to provide inlet recesses in the sides of the raceways to permit insertion of the antifriction rolling elements, as is necessary in the common way of assembling antifriction bearings. It also permits the use of a full quota of the antifriction rolling elements in the bearing raceways, as these elements may be inserted in the raceways before the expanding operation of the inner bearing member, and thus a full series or quota of these elements may be placed in the aligned raceways before expanding of the inner member. Also for the same reasons this method permits the use of a one-piece separator for the rolling elements if this type of bearing is desired. It has greater load capacity because a full quota of the rolling elements may be used, or for the same sized bearing the load for each individual rolling element is reduced for the same reasons. The bearing may be heat-treated after assembly for greater load capacity. With this method the sizing and fit of the various elements may be very accurately controlled during the assembling operation. Thus by using the proper sized punch with the proper sizing of the undersized bearing member and the hole through it, the expanding operation may be so controlled as to expand it accurately to the proper running bearing fit and this may be accurately secured by the mere proper expansion of the inner member. Still further, a greater coining, sizing and burnishing effect may be secured if desired, by expanding the inner bearing member somewhat beyond its finished size in the assembled bearing, which will thus in effect be a preloading of the bearing, and this in combination with simultaneous relative rotation between the inner and outer bearing members will produce a coining, sizing and burnishing action of the two raceways by the pressure and rolling action of the antifriction elements on the surfaces of these raceways, such as is desirable for high quality and heavy bearings to bring them to an accurate, smooth bearing running fit. This method really irons the surfaces of the raceways by working and displacing metal. It will further be seen that by this method the bearing may be completely assembled, finished and made ready for use by a single operation.

Having thus set forth the nature of my invention, I claim:

1. A machine for assembling inner and outer bearing members of telescoped antifriction bearings comprising a die mechanism adapted to hold the outer member coacting with a supporting mechanism for holding the inner member in the opening of the outer member with rolling elements between the members, a punch mechanism for expanding the inner member to bring the members and the rolling elements into bearing relation and to interlock them, and a mechanism for rotating one member relative to the other during the expanding operation.

2. A machine according to claim 1 including a rotatable support mounted in a base block provided with a downwardly and inwardly tapered recess, and a plurality of die blocks similarly tapered on their outer surfaces mounted in the recess and provided with recesses in their upper surfaces adapted to hold the outer raceway member of a bearing, spring means tending to shift the die blocks upwardly and means for rotating said die block support.

3. A machine according to claim 1 in which there is a rotatable support for the die mechanism.

4. A machine according to claim 1 in which there is a rotatable support for the inner bearing member.

5. A machine according to claim 1 in which the punch mechanism for expanding the inner member is a rotating plunger and in which the die mechanism rotates in a direction opposite to that of the plunger to rotate the bearing members in opposite directions.

6. Apparatus for assembling the inner and outer bearing members of telescoped antifriction bearings, comprising a lower die provided with a recess to retain the outer member, a rotatable support in the die for supporting the inner member with the raceways in alignment, a vertically movable plunger, means for forcing the plunger through the inner member to expand this member and effect interlocking engagement between the members and anti-friction rolling elements in their aligned raceways, and means for rotating the plunger to rotate the inner member to burnish the raceways by action of the rolling elements.

7. Apparatus according to claim 6 including an upper die adapted to engage the bearing and retain it in the lower die.

8. A method of making antifriction bearings comprising forming an outer bearing member with a circular opening through it and a raceway in the wall of the opening, forming an inner bearing member with a circular outer wall and a second raceway in the outer wall, at least one of the members being of ductile material, placing the inner member in the opening in the outer member with rolling elements between the raceways, diminishing the space between the members by deforming the ductile member to interlock the members through the rolling elements, the deformation being carried out to the extent that radial force is exerted by one of the members against the other member through the rolling elements, and causing the members to rotate relative to each other during at least a part of the step of diminishing the space between the members.

9. A method as set forth in claim 8 in which the inner member is of ductile material and it is expanded.

10. A method of making antifriction bearings comprising forming an outer bearing member with a circular opening through it and a raceway in the wall of the opening, forming an inner bearing member with a circular outer wall and a second raceway in the outer wall, at least one of the members being of ductile material, placing the inner member in the opening in the outer member with rolling elements between the raceways, diminishing the space between the members by deforming the ductile member to interlock the members through the rolling elements, and causing radial force to be exerted by one of the members against the other member through the rolling elements and the members to rotate relative to each other during at least a part of the step of diminishing the space between the members.

References Cited in the file of this patent

UNITED STATES PATENTS

| | | |
|---|---|---|
| 1,080,169 | Reed | Dec. 2, 1913 |
| 2,185,483 | Ward | Jan. 2, 1940 |
| 2,606,361 | Keller | Aug. 12, 1952 |
| 2,629,165 | Stillwagon | Feb. 24, 1953 |
| 2,719,765 | Menne | Oct. 9, 1955 |
| 2,783,528 | Menne | Mar. 5, 1957 |

FOREIGN PATENTS

| | | |
|---|---|---|
| 617,991 | Great Britain | Feb. 15, 1949 |
| 924,924 | Germany | Mar. 10, 1955 |